US008727850B2

(12) United States Patent
Burnside et al.

(10) Patent No.: US 8,727,850 B2
(45) Date of Patent: May 20, 2014

(54) COMPUTER GAMING DEVICE AND METHOD FOR COMPUTER GAMING

(75) Inventors: Robert S. Burnside, Fayetteville, TX (US); Jerry W. Biesel, Dallas, TX (US)

(73) Assignee: Rational FT Enterprises Limited, Douglas (IM)

( * ) Notice: Subject to any disclaimer, the term of this patent is extended or adjusted under 35 U.S.C. 154(b) by 1104 days.

(21) Appl. No.: 11/316,573

(22) Filed: Dec. 20, 2005

(65) Prior Publication Data

US 2007/0155460 A1 Jul. 5, 2007

(51) Int. Cl.

| | |
|---|---|
| ***A63F 9/24*** | (2006.01) |
| ***A63F 13/00*** | (2014.01) |
| ***G06F 17/00*** | (2006.01) |
| ***G06F 19/00*** | (2011.01) |
| ***A63F 9/00*** | (2006.01) |

(52) U.S. Cl.
USPC ................................ 463/13; 463/42; 273/309

(58) Field of Classification Search
USPC ....................................... 463/42, 13; 273/309
See application file for complete search history.

(56) References Cited

U.S. PATENT DOCUMENTS

| | | | | |
|---|---|---|---|---|
| 5,752,702 | A | 5/1998 | McDoniel | 273/292 |
| 6,375,567 | B1 | 4/2002 | Acres | |
| 6,390,474 | B1 | 5/2002 | Terminel et al. | 273/292 |
| 6,416,407 | B1 | 7/2002 | Carrico et al. | 273/292 |
| 6,481,717 | B1 | 11/2002 | Richardelle | 273/292 |
| 6,575,831 | B1 | 6/2003 | Gonen et al. | 463/25 |
| 6,902,166 | B2 | 6/2005 | Stern | 273/292 |
| 7,288,027 | B2 * | 10/2007 | Overton | 463/42 |
| 2002/0094869 | A1 * | 7/2002 | Harkham | 463/42 |
| 2003/0070178 | A1 | 4/2003 | Boyd et al. | 725/110 |
| 2003/0073494 | A1 | 4/2003 | Kalpakian et al. | |
| 2004/0017043 | A1 | 1/2004 | Moody | 273/292 |
| 2004/0036217 | A1 | 2/2004 | Schlumbrecht | 273/292 |
| 2004/0082384 | A1 | 4/2004 | Walker et al. | |
| 2004/0132521 | A1 | 7/2004 | Peterson | |
| 2004/0183254 | A1 | 9/2004 | Schlumbrecht | 273/292 |
| 2005/0116416 | A1 | 6/2005 | Peterson | 273/292 |
| 2005/0215300 | A1 * | 9/2005 | Oliveras | 463/13 |

(Continued)

FOREIGN PATENT DOCUMENTS

| | | |
|---|---|---|
| CA | 2 280 194 | 2/2001 |
| WO | WO 99/64128 | 12/1999 |

(Continued)

OTHER PUBLICATIONS

PCT International Search Report and Written Opinion (ISA/US) for PCT/US06/39086; 9 pages, Sep. 26, 2007.

(Continued)

*Primary Examiner* — Arthur O Hall
*Assistant Examiner* — Wei Lee
(74) *Attorney, Agent, or Firm* — Kenyon & Kenyon, LLP

(57) ABSTRACT

A system for computer gaming includes a processor configured to provide a first table of a first group of players grouped together to play a first hand and provide to each of the first group of players one or more cards for the first hand. The system includes an interface couple to the processor and configured to receive from a first player of the first group of players a request to fold the one or more cards of the first player. The processor is also configured to automatically move the first player to a second table of a second group of players grouped together to play a second hand.

54 Claims, 2 Drawing Sheets

(56) References Cited

U.S. PATENT DOCUMENTS

| | | | | |
|---|---|---|---|---|
| 2006/0068864 | A1 * | 3/2006 | White et al. | 463/13 |
| 2006/0068870 | A1 * | 3/2006 | Crawford et al. | 463/13 |
| 2006/0154710 | A1 * | 7/2006 | Serafat | 463/1 |
| 2006/0287097 | A1 * | 12/2006 | Moshal | 463/42 |
| 2007/0218997 | A1 * | 9/2007 | Cho | 463/42 |
| 2008/0280663 | A1 | 11/2008 | Shar et al. | |
| 2009/0189351 | A1 | 7/2009 | Baerlocher et al. | |

FOREIGN PATENT DOCUMENTS

| | | |
|---|---|---|
| WO | WO 03/011407 A1 | 2/2003 |
| WO | WO 2004/004853 | 1/2004 |
| WO | WO 2004/071601 | 8/2004 |
| WO | WO 2005/033825 | 4/2005 |
| WO | WO 2007/059310 | 5/2007 |
| WO | WO 2007/078372 | 7/2007 |
| WO | WO 2009/100582 | 8/2009 |

OTHER PUBLICATIONS

Party Poker.net—Texas Hold'em Rules, 2005 Interskill Games Limited, http://www.partypoker.net/games/how_to_play/texas_holdem.html; pp. 1-4.

Party Poker.net—Omaha 8 Better Poker Game Rules, 2005 Interskill Games Limited, http://www.partypoker.net/games/how_to_play/omaha_8better.html, pp. 1-5.

Party Poker.net—Seven Card Stud Poker Game Rules, 2005 Interskill Games Limited, http://www.partypoker.net/games/how_to_play/seven_card_stud.html, pp. 1-3.

Party Poker.net—Seven Card Stud 8 or better Poker Game Rules, 2005 Interskill Games Limited, http://www.partypoker.net/games/how_to_play/stud_8better.html, pp. 1-3.

Party Poker.net—Information Sheet, 2005 Interskill Game, http://www.partypoker.net, 1 pg.

PokerStars.net—Information Sheet; http://www.pokerstars.net, 1 pg.

Communication from Government of Pakistan, IPO, Karachi—Examination Report; regarding Patent Application No. 19/2011 (2 pages), Aug. 22, 2011.

Communication Pursuant to Article 114(2) EPC for Application No. 06 836 201.1-2221—Observations by a third party for EP 1968720; (8 pages), Sep. 13, 2011.

Australian Government (IP Australia); Examiner's First Report on Patent Application No. 2006333559 (3 pages), Sep. 13, 2011.

Communication Pursuant to Article 94(3) EPC for Application No. 06 836 201.1-2221 (6 pages), Sep. 21, 2011.

IPO.UK; Intellectual Property Office South Wales; Search Report under Section 17/6 for Application No. GB1022044 ; (2 pages), Oct. 13, 2011.

Communication/extended European search report for PCT/US2006/039086; 8 pages, Feb. 4, 2011.

Summons to Attend Oral Proceedings Pursuant to Rule 115(1) EPC for European Patent Application No. 06836201.1 dated Oct. 4, 2012, 7 sheets.

Response to Summons to Attend Oral Proceedings Pursuant to Rule 115(1) EPC for European Patent Application No. 06836201.1 dated Jan. 4, 2013, 9 sheets.

Result of Consultation by Telephone with the Applicant for European Patent Application No. 06836201.1 dated Feb. 6, 2013, 2 sheets.

Examination Report under Section 18(3) issued by the UK Intellectual Property Office on Nov. 14, 2012 for UK Patent Application No. 1022044.0, 5 sheets.

EPO Communication along with extended European Search Report for European Patent Application No. 10250085.7, dated May 19, 2010, 5 sheets.

Reply to Written Opinion for European Patent Application No. 10250085.7, dated Jul. 3, 2012, 4 sheets.

EPO Communication pursuant to Article 94(3) EPC for European Patent Application No. 10250085.7, dated Aug. 30, 2012, 5 sheets.

Response to the Examination Report issued by the UK Intellectual Property Office on Apr. 27, 2011 for UK Patent Application No. 1022044.0, Mar. 19, 2012.

Response to Communication from the European Patent Office for European Patent Application No. 06836201.1 dated Sep. 21, 2011, Mar. 21, 2012.

Combined Search and Examination Report under Sections 17 and 18(3); IPO; Patents Directorate, South Wales for GB1022044.0; 8 pages, Apr. 27, 2011.

Notification of Transmittal of the International Search Report and the Written Opinion of the International Search Authority, or the Declaration for PCT/IB2010/003383 (12 pages), Jul. 21, 2011.

Written Decision to Refuse a European Patent Application for European Patent Application No. 06836201.1 dated Mar. 26, 2013, 16 sheets.

Examination Report in UK Patent Application No. GB1022044.0, dated Jun. 12, 2013, 3 pages.

* cited by examiner

COMPUTER GAMING DEVICE AND METHOD FOR COMPUTER GAMING

TECHNICAL FIELD

This invention relates in general to gaming and, more particularly, to a computer gaming device and method for computer gaming.

BACKGROUND

In a normal game of poker, people sit together at a table with a deck of cards. Each player takes a turn dealing the cards clockwise beginning at the left of the dealer until all players have a designated number of cards. The player to the left of the dealer who receives the first card will deal the next hand.

In professional games at card rooms, a separate person referred to as the "dealer" physically deals the cards, but he does not play. Since the deck resides with the stationary dealer, a round disk called a dealer's button or simply the "button," is placed in front of the player sitting in the dealer's seat. The person on the button or dealer's seat has an advantage, because he acts last on his hand, after the other players.

Many people are now playing poker on the Internet. A number of companies host games by having a website or URL, such as Party Poker and Poker Stars. The host sites generally offer a variety of games, and the number of players in a game will vary. The same type of game may be offered with a different maximum number of players. The lower the maximum number of players, the less the quality of the hand necessary to "call" and the faster the game. Where fifty-five hands an hour might be played in a nine player game, one hundred hands an hour might be played in a six player game.

A popular online poker game in the United States is Hold 'Em, and at times it comprises approximately eighty percent of the online games played. Four other popular games with a smaller percentage of the market include Four Card Omaha High, Four Card Omaha 8OB (high-low eight or better), Seven Card Stud High and Seven Card Stud 8OB. Other U.S. games comprise a smaller percentage of the market. The relative popularity of these and other games typically changes over time. There are also numerous other poker games, including foreign poker games.

In poker games, it is possible for two or more people to play together in collusion (a form of cheating). To do this, the players may use signals designed to keep other players from discovering their scheme. Although Internet and other organizations providing electronic play do their best to eliminate collusion, it can be a major problem. In some cases an online poker player can play two hands at the same table under two different names. The cheater may login by dialing different servers using different login names. The servers may have different Internet or IP addresses, and there is no reliable method for identifying or tracking a person playing under two different names at the same table.

Besides collusion, another problem with poker play is boredom. Players typically respond serially in a clockwise fashion, each being forced to wait his turn, even if the player just intends to fold. Then, when a player's turn comes and he folds, he has to wait for the hand to end before he becomes active again. In some cases, online poker sites attempt to allow players to remain more active by letting players play at more than one table at a time. To do this, a player may open a second window and play at two different tables at the same time. This activity, referred to as "double dipping" in poker jargon, does afford a player more action by allowing him to play twice as many hands per hour. However, it is not seamless. There are frequent times when the player is idle at both tables, and there are times when he will need to respond concurrently at both tables.

SUMMARY

The present invention provides a computer gaming device and method for computer gaming that substantially eliminate or reduce at least some of the disadvantages and problems associated with previous methods and systems.

Some embodiments of the invention relate to an apparatus/system of playing a game. As such these embodiments can be considered to relate to a device or machine system for playing a game. The game may be, for example, the game of poker or some other game in which hands are played.

Gaming machines, or amusement machines, or amusement-with-prizes machines, are well known. They range from slot machines, "fruit machines," and other large, immobile, machines housed in a housing or carcass, to hand-held computer game machines. Other known gaming and amusement apparatus include Internet gaming systems. Making and selling, and otherwise providing, game machines is a large industry.

In accordance with a particular embodiment, a game machine system for computer gaming includes a processor configured to provide a first table of a first group of players grouped together to play a first hand and provide to each of the first group of players one or more cards for the first hand. The system includes an interface couple to the processor and configured to receive from a first player of the first group of players a request to fold the one or more cards of the first player. The processor is also configured to automatically move the first player to a second table of a second group of players grouped together to play a second hand.

Some embodiments of the invention increase the security of a game machine system by moving players to different tables. That is, in embodiments of the invention the machine system controls the routing of a user of the system to particular tables to play other users. Embodiments of the invention provide a new device/machine system that changes how users of the device/machine system are grouped to play the game on the machine so as to hinder collusion between the users. The game machine is therefore less prone to fraudulent use.

Some embodiments of the invention reduce the inactive period a user experience when using the game machine system thereby providing more efficient use of machine's resources. Since the user is inactive for less then the devices resources (e.g., processor, interface etc.) spend less time idle.

In some embodiments the game machine is distributed so that there are a plurality of terminals located at different places that are connected to a processor/system platform at a further, different place via a communication network (such as, by way of example, the Internet or a local network).

In one form, according to an embodiment of the invention, the game machine takes the form of a personal computer that is suitably programmed to perform the game. Such a game machine may allow the user to play the game with other users of game machines. In another form the personal computer provides the user-input device and the display but the processing necessary to perform the game is provided remotely, (e.g. by a server), and the processing is accessed by the personal computer via a communication network. Of course some of the processing may be provided by the personal computer and some of the processing may be provided remotely (e.g. by a server).

In accordance with a particular embodiment, a method for computer gaming includes providing a first table of a first group of players grouped together to play a first hand and providing to each of the first group of players one or more cards for the first hand. The method includes receiving from a first player of the first group of players a request to fold the one or more cards of the first player and automatically moving the first player to a second table of a second group of players grouped together to play a second hand.

The method may include, after receiving the request to fold from the first player, moving the first player to a queue comprising additional players to be moved to the second table. The method may include, after moving the first player to the queue, determining that the queue comprises enough players to be moved to the second table. The method may also include, upon completion of the first hand at the first table, automatically moving each player of the first group of players that are remaining at the first table when the first hand is completed to the queue. The method may include determining that the queue comprises enough players to be moved to a third table to play an additional hand and moving a third group of players from the queue to the third table.

The method may include, after determining that the queue comprises enough players to be moved to the second table, determining an order according to which current players in the queue will be pulled to be moved to the second table. The order may comprise a first-in, first-out order or an order based on a priority associated with each player. The method may include determining a seat location of the first player for the second table based on the seat location of the first player in previous hands played by the first player. The method may include, after completion of the first hand, presenting to the first player an identification of each card provided in the first hand to a winning player of the first hand and each action taken during the first hand by the winning player.

Technical advantages of particular embodiments include methods and systems that move players to different tables based on the player's availability in a game. Players folding or otherwise completing a given hand at a given table may be automatically moved to another table to begin a new hand. Therefore, the player may not have to wait until the end of the hand at the table at which he folded before continuing play in another hand. In addition, the players at the new table may be different than those at the previous table of the folding player. This functionality helps to reduce collusion by a player or several players, because it inherently separates collusive players who normally sit at the same table. In particular embodiments players may move to one or more queues upon folding or otherwise completing a hand. They may be pulled out of the queues in any suitable order to join a new table.

As the number of tables increases, the process of seating idle players may create a larger number of active tables, and a player may seamlessly play more hands over an equal timeframe when compared to a conventional game. Given the increased action of multiple active tables in the virtual table format, if the game is a real money game featuring a rake from the pot for the game provider, then more money may be raked as compared to a conventional table format. Particular embodiments also provide a fair, flexible and robust seating process for seating players at new tables.

For Hold 'Em, a player may be inactive over sixty percent of his time. Using functionality described herein, when there are a large number of players involved in playing at multiple tables, the action can be at a rate several times the normal rate of conventional games. In addition, this may occur seamlessly and in an anti-collusive environment.

In addition, particular embodiments may offer different sized tables according to player preferences. For example, dealer's choice functionality may be offered in which a player identified as the dealer has the option to not only select a type of game to play but also to establish seating for the game. This may result in different seatings for a particular type of game, such as no-limit Hold 'Em, according to player preferences.

Other technical advantages will be readily apparent to one skilled in the art from the following figures, descriptions and claims. Moreover, while specific advantages have been enumerated above, various embodiments may include all, some or none of the enumerated advantages.

BRIEF DESCRIPTION OF THE DRAWINGS

For a more complete understanding of particular embodiments of the invention and their advantages, reference is now made to the following descriptions, taken in conjunction with the accompanying drawings, in which.

DETAILED DESCRIPTION

Figure 1:
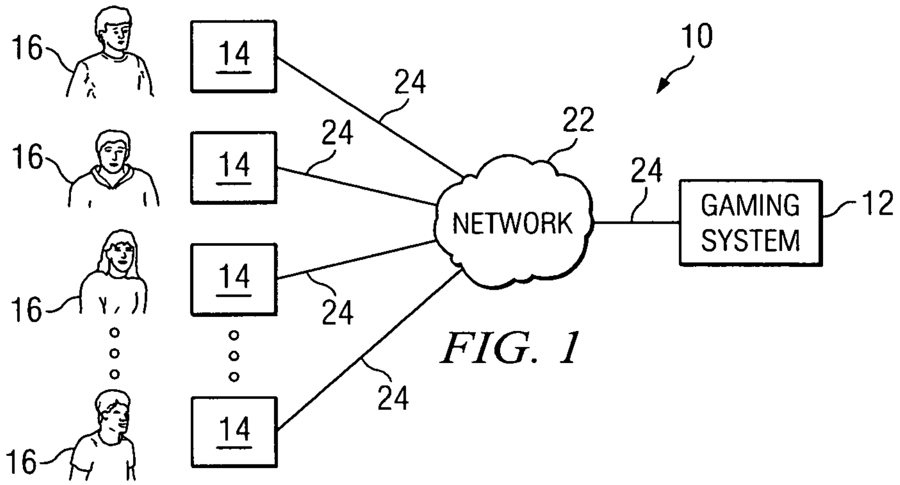
FIG. 1 illustrates a gaming network, in accordance with a particular embodiment.

FIG. 1 is illustrates a gaming network 10, in accordance with a particular embodiment. Gaming network 10 comprises a gaming system 12 and a plurality of access elements 14. Gaming system 12 is coupled to access elements 14 through a communication network 22. Communication network 22 allows gaming system 12 and access elements 14 to communicate with each other through a plurality of communication links 24. In particular embodiments, gaming system 12 may be provided and maintained by a gaming company or organization. Access elements 14 allow users to access gaming system 12 through communication network 22.

Gaming system 12 provides various games for play by users 16 accessing gaming system 12 through access elements 14. In particular embodiments, these games may include electronic poker games such as Hold 'Em, Omaha, Omaha Hi-Low, Seven Card Stud and Seven Card Stud Hi-Low. Gaming system 12 may also provide other games, including Asian and other foreign games. Users 16 may play games provided through gaming system 12 for free, for money or for various other prizes, such as coupons, discounts and merchandise. In some games, the user may bet or wager real money or points or other items with or without monetary value. In the case of wagering and playing for money, a user may deposit money in an account with gaming system 12 by check, credit card, wire transfer or any other method. Once money is in a player's account with the gaming system, the player may purchase "chips" to be used in a game, up to the amount he has on deposit.

In particular embodiments, players are moved to different tables based on the player's availability in a game. For example, upon folding their cards a player at one table may be moved (for example, through a queue or directly) to another table to begin a new hand. Therefore, the player may not have to wait until the end of the hand at the table at which he folded before continuing play in another hand. This functionality helps to reduce collusion by a player or several players, because it inherently separates collusive players who normally sit at the same table. By dispersing players to new tables, players who are partnering or playing two or more seats will not be able to consistently play at the same table. As the number of tables increases, the process of seating idle players may create a larger number of active tables, and a player may seamlessly play more hands over an equal time-frame when compared to a conventional game. Given the increased action of multiple active tables in the virtual table format, if the game is a real money game featuring a rake from the pot for the game provider, then more money may be raked as compared to a conventional table format.

In the illustrated embodiment, communication network 22 enables communication between access elements 14 and gaming system 12, all of which may be distributed across multiple cities and geographic regions. Network 22 may comprise a one or more or partial wide area networks (WANs), public switched telephone networks (PSTNs), local area networks (LANs), the Internet or any other communications and data exchange networks or systems that enable communication between communication system elements, including public or private wireline or wireless networks. For example, in particular embodiments, some access elements 14 may communicate with gaming system 12 over the Internet, while other access elements 14 may communicate with gaming system 12 over a LAN. Network 22 may also comprise any of a number of network components to enable communication between elements as described herein. Such network components may include gate keepers, call managers, routers, hubs, switches, gateways, endpoints or other hardware, software or embedded logic implementing any number of communication protocols that allow for the exchange of data in gaming network 10. The term "communication network" should be interpreted as generally defining any network capable of transmitting audio and/or video telecommunication signals, data and/or messages. Generally, communication network 22 provides for the communication of packets, cells, frames, or other portions or data or information between and among gaming system 12 and access elements 14. In particular embodiments, communication network 22 employs communication protocols that allow for the addressing or identification of access elements, nodes and/or systems coupled to network 22. For example, using internet protocol (IP), each of the components coupled together by communication network 22 may be identified using IP addresses. In this manner, communication network 22 may support any form and/or combination of point-to-point, multicast, unicast or other techniques for exchanging media data and information among components of gaming network 10. Any network components capable of exchanging audio, video or other data using frames, packets or otherwise may be included within the scope of particular embodiments.

Access elements 14 may each be associated with one or more users of gaming system 12. Access elements 14 may include any combination of hardware, software and/or encoded logic that provides communication services to a user. For example, access elements 14 may include a telephone, a computer running telephony software, a video monitor, a personal computer, a camera, an IP phone, a cell phone, a personal digital assistant (PDA) or any other communication hardware, software and/or encoded logic that supports the communication of data or information with gaming system 12 through communication network 22. Access elements 12 may also include unattended or automated systems, gateways, other intermediate components or other devices that can establish media sessions. In particular embodiments, gaming system 12 provides a website that makes information and programming stored at gaming system 12 available to access elements 14. Access elements 14 may access gaming system 12 information, files and functionality using a Uniform Resource Locator (URL) of the website. The website may include web pages that may comprise text, images, sounds, animations and other information. In particular embodiments, access elements 14 may operate software to act as an interface between users 16 and gaming system 12. In some cases this software may generally be referred to as "thin" or "dumb" software in situations where management and control of various games resides in gaming system 12.

Communication links 24 connecting access elements 14 and gaming system 12 to network 22 may comprise any type of communication links capable of supporting data transfer, such as wireline or wireless links. In particular embodiments, communication links 24 may comprise, alone or in combination, cable links, Digital Subscriber Line (DSL) links, Integrated Services Digital Network (ISDN) links, Asymmetric Digital Subscriber Line (ADSL) links, T1 or T3 communication lines, wireless communication links, hardware lines, telephone links or other suitable types of data communication links. Communication links 24 may also connect to a plurality of intermediate servers or other components between communication network 22 and gaming system 12 and between communication network 22 and access elements 14.

Figure 2:
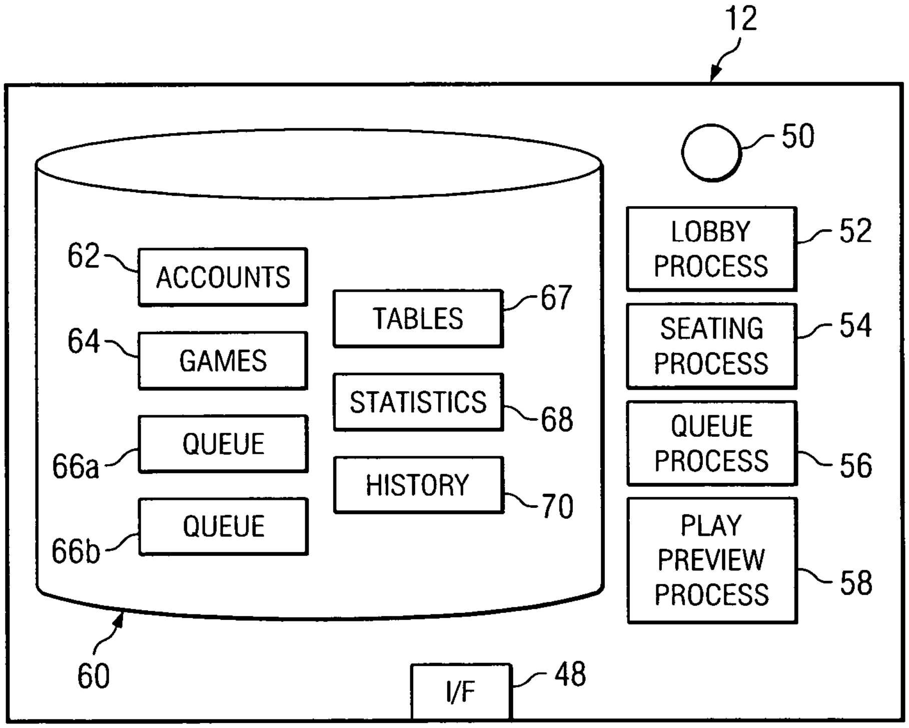
FIG. 2 illustrates a gaming system of FIG. 1, in accordance with a particular embodiment.

FIG. 2 illustrates gaming system 12, in accordance with a particular embodiment. Gaming system 12 includes an interface 48, a processor 50, a lobby process 52, a seating process 54, a queue process 56, a play review process 58 and a memory 60. Particular embodiments may include a gaming system have none, some or all of the same or similar components as those described herein to perform various functionality described herein.

Interface 48 couples gaming system 12 with communication network 22 and is operable to receive communications from and transmit communications to communication network 22. Processor 50 may be a microprocessor, controller, or any other suitable computing device, resource, or combination of hardware, software and/or encoded logic operable to provide, either alone or in conjunction with other components of gaming system 12, functionality of gaming system 12. Such functionality may include controlling, managing and providing various features discussed herein to a plurality of users, such as users of access elements 14 accessing the gaming system.

Memory module 60 may be any form of volatile or non-volatile memory including, without limitation, magnetic media, optical media, random access memory (RAM), read-only memory (ROM), removable media, or any other suitable local or remote memory component. Memory module 60 may store any suitable data or information, including software and encoded logic, utilized by gaming system 12. In the illustrated embodiment, memory module 60 includes accounts 62, games 64, queues 66*a* and 66*b*, tables 67, statistics 68 and history 70. Gaming systems in other embodiments may include memory that includes some, none or all of the same or similar components as those described with respect to memory module 60.

Accounts 62 generally include information relating to various players who have an account with gaming system 12. Such information may include, for example, a player's history of play, account balance (e.g., in terms of money, chips, points or otherwise), profile, current play information (e.g., table or queue status) or any other suitable information. Games 64 generally include information associated with games that may be provided through gaming system 12. Such information may include, for example, gaming software, rules, options, procedures, configurations and other information associated with games provided.

Queues 66 generally store players waiting to join tables associated with games of gaming system 12. Queues 66 may store any suitable information associated with the players in the queues, such as information described below that may be used with various queue and seating process functionality. Particular embodiments may include any suitable number and/or type of queues for various situations. For example, each queue may be associated with a particular type of game offered through gaming system 12. In some cases queues comprising idle players waiting to be placed in a table may be referred to as idle player queues. Tables 67 may generally include information associated with various tables of various games. For example, such information may include number of tables, current players at tables, game status information of tables, table betting parameters and any other suitable information to provide the functionality described herein.

Statistics 68 generally includes statistical information kept by gaming system 12, such as game statistics, player statistics, situational statistics related to games and/or players in various situations and any other suitable statistical information. Statistics 68 may keep detailed player statistics that help define a player's skill level, such as statistics regarding a player's aggressiveness, folding percentage and raise percentage. In some embodiments statistics for a particular player may be made available to other players either during or outside of a particular game. History 70 generally includes historical information associated with gaming system 12, such as game history, player history, recorded games and recorded hands or situations.

Lobby process 52, seating process 54, queue process 56 and play review process 58 may comprise suitable hardware, software or encoded logic processes, algorithms or methods executed by gaming system 12, for example in conjunction with processor 50. Gaming systems in other embodiments may provide similar or different processes to execute some or all of the functionality described herein.

Various functionality of gaming system 12 that may be provided in one or more embodiments is described herein. This functionality may be provided in any of a number of suitable games, such as various poker games and bridge. Particular games which may benefit from embodiments described herein include games with multiple players where the play progresses serially, where there may be some idling of players and some intellectual pauses.

In particular embodiments, a user 16 may log-in to gaming system 12 by keying in a unique login name, which may ultimately be displayed at the user's selected seat at a poker table. In some embodiments, when a player indicates he wishes to play a particular game for the very first time, lobby process 52 may create a player record in accounts 62. In particular embodiments, as further discussed below, to control the player's seating a "projected-next-seat-number" variable or indicator may be associated with the player. For a first time player playing particular games such as Hold 'Em, lobby process 52 may set the player's "projected-next-seat-number" in his account 62 to the big blind or seat number two to influence the seating algorithm such that it may cause a new player to play the big blind.

After the user has successfully logged in, he is generally presented with an option to choose the type of game he wishes to play, and he may be connected to the software of the chosen game which displays game information at the user's access element 14. This information may be a summary listing the number of tables and players involved in that particular game or, under a typical online format, a list of active tables, some of which may have open seats. In the virtual table format, a player does not have to go to a table screen to select an open seat because the tables are transient. When a virtual table game player selects a game to play, he may be placed in an idle players' queue and automatically placed at a table when there are enough players in the queue to form a new table. In some embodiments, new players may be able to view a table screen before deciding whether to play in that particular type of game. When a player is presented with the table screen, the screen may display other players 16 who may be accessing gaming system 12 through other access elements 14 from, for example, different geographic locations. In some cases, each player may be identified by their respective login name. There may be an image of a stationary dealer at the table who deals but does not play.

As a particular hand of play begins, the cards may be dealt electronically. A randomizing algorithm may be used to shuffle the cards, so the play may be faster than a normal manual game in which the cards must be physically shuffled. In some embodiments, an active player may view or see his cards on a screen of his access element, and each player may act on his hand in clockwise order. A player may immediately decide, based on his hand of cards dealt to him, whether to continue play. It is not typical for all players playing a given dealt hand to stay to the end of the hand until a winner is determined. If, at a point of time after the hand is dealt, a player determines that his hand is insufficient to warrant playing further, he can exercise an option to not play his hand. This is typically called "folding." Typically, once a player folds he waits until the hand is played out (for example until a winner is determined) and then may play the next hand at the table.

In particular embodiments, once a player folds at a given table, the player may be moved to another table (e.g., a new group of players) via a queue or otherwise to play a new hand with the new group of players without the folding player having to wait until the end of the hand at the table at which the player folded before continuing play. The new table may comprise other players who have folded at the same or different tables, players who have finished out a hand at the same or different tables and/or new players just beginning a gaming session. In some cases players such as those who have just folded at a given table may be moved into a queue by queue process 56 to wait until there are enough players in the queue to start a hand at a different table. Players in a queue may be allowed to watch a hand at which they just folded while waiting on a new table to form (e.g., while waiting on enough people in the queue to form a new table). When the queue comprises enough people to form a table with a desired number of players, queue process 56 will display a new table screen for each player showing the player seated with other idled players from the queue. In particular embodiments, players in a queue may not be able to see the queue or any information associated with the queue, such as their location in the queue and the identification or number of other players in the queue.

Figure 3:
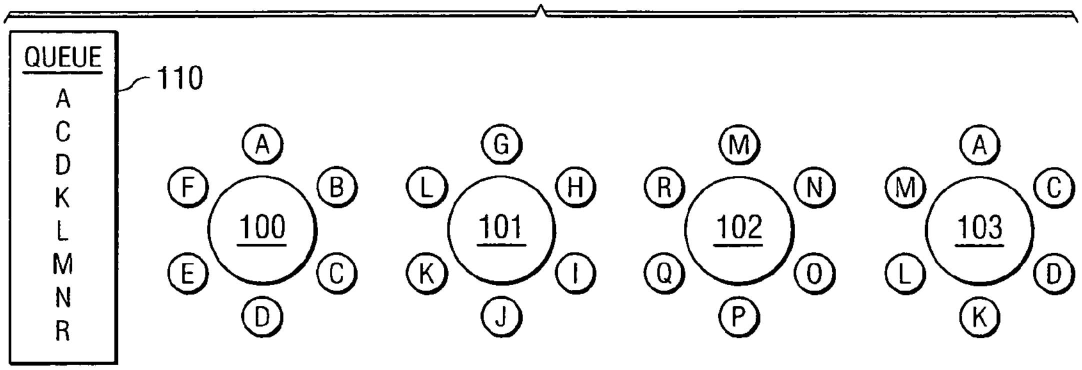
FIG. 3 illustrates example functionality of a queue process, in accordance with a particular embodiment.

As a general example in operation of queue process 56, FIG. 3 illustrates a plurality of virtual tables 100-103 of gaming system 12. Tables 100-102 each comprise a collection of players playing a given poker game such as those mentioned above. Table 100 includes players A-F, table 101 includes players G-L and table 102 includes players M-R. While six players are illustrated as playing at each table, it should be understood that tables in various embodiments may include any suitable number of players, and embodiments may include tables having different numbers of players while still incorporating the functionality described herein.

Assume for this example that hands are dealt at tables 100-102. At table 100 players A, C and D fold after reviewing their initial, dealt hand. They may fold at any suitable time, such as when their turn to bet arises at the table. Players A, C and D may then be placed in queue 110 to wait on enough additional players to form another table. At table 101 players K and L fold and are placed in queue 110. At table 102 players M, N and R fold and are placed in queue 110. This folding may occur, for example, at any time during the current hand at that table. In some cases it may occur after multiple rounds of betting and after additional cards have been dealt in a hand.

Thus, queue 110 comprises players A, C, D, K, L, M, N and R. For purposes of this example, assume that this embodiment operates on a first-in, first-out (FIFO) basis. Therefore, if players folded and were placed in queue 110 in the order illustrated (e.g., A, C, D, K, L, M, N and R) then they would be removed from the queue to join another table in that order. When players are pulled from the queue to form a table, their game status may change from idle to active. Assume that a new table formed from those in the queue also needs to comprise, according to the game options, 6 players. As a result, players A, C, D, K, L and M are joined together to play a new hand at table 103. Players N and R may remain in the queue to wait on enough additional players to join another table.

The remaining players at tables 100, 101 and 102 may play out their respective hands. When a remaining player from any of those tables folds, he may be placed in a queue, such as queue 110 or a different queue, for joining another group of players to play a new hand. Once the outcomes of the respective hands at tables 100, 101, and 102 are determined, the players remaining at those tables may be joined at their tables by other players from a queue or otherwise to play a new hand or they may be placed into a queue, such as queue 110, for joining another group of players to play a new hand.

Particular embodiments may utilize any number of tables having any suitable number of players at a given time. For example, with a large number of users 16 utilizing gaming system 12, a large number of tables may be used. As indicated above, some tables may begin hands with different numbers of players. Particular embodiments may also utilize any number of queues for holding any number of players. Each queue may be designated to hold one or more respective categories of players. In particular embodiments, the number of tables and queues may be set and changed dynamically as the number of players changes in order to provide action that reduces wait time for players so that the action and move to different tables appears almost seamless to the players. For example, a player who has just folded or otherwise completed a hand at one table may be moved to a new table. To the player, the move to the new table may appear almost seamless even though gaming system 12 may have actually placed the player in queue and pulled the player from the queue for placement at the new table according to the queue and seating processes of the system. In some cases gaming system 12 may not notify the player that he was actually in a queue waiting on a new table to be formed. In some embodiments the selection of which of a group of different tables to move the player to may be made randomly or using any desired criteria.

Players may be pulled from queues in any desired order, such as FIFO or in another desired manner. For example, players having a higher priority with gaming system 12 (e.g., as determined by play, bankroll, payment or otherwise) may be pulled from a queue to join a new table before another player having a lower priority. In addition, the pulling of players from queues may be done strategically by gaming system 12 to achieve desired outcomes (e.g., to speed up or slow down certain players). In some cases players may be pulled from the queue in random order.

In some games such as Hold 'Em and other poker games, a player's location at a table with respect to the "button" is important for a given hand. The button typically rotates one slot around the table for each hand, typically in the same direction as the betting direction. When in a given game a player is identified as a dealer and such identification rotates through the players, the button typically corresponds to the player identified as the dealer. The person to the left of the dealer or button generally bets first for a hand in a given round of betting, and betting typically moves in a clockwise direction. Each round of betting for a given hand proceeds in a similar manner. Thus, the person on the button or dealer's seat typically has an advantage, because he acts last on a given round of betting, after the other players have taken their turn.

In some games such as "Hold 'Em," seat one, just to the left of the dealer or button, is referred to as the small blind, and seat two, just to the left of seat one, is referred to as the big blind. These blind seats are treated differently from the rest of the seats, because the blinds have to ante before they are dealt their first cards. The rest of the players in seat three through the last seat at the table, referred to as the dealer's button, may fold without anteing after they have seen their initial cards. The big blind ante is more of a disadvantage because it is larger than (e.g., normally twice the size of) the small blind ante. In some poker games, when a player plays his first hand, he has to ante the same amount as the big blind. Putting up an ante equal the big blind may be is called "posting," which is similar to an entry fee to the game.

Thus, being situated one spot or two spots to the left of the dealer or button may be a disadvantage for a given hand since players may have to bet without having seen their cards. As suggested above, the further away a player is located from the left of the dealer or button when betting proceeds in a clockwise direction then the greater the advantage for a given hand.

In particular embodiments the seat location with respect to a dealer or button of folding players placed in a queue is associated with the players so that it can be used, for example by seating process 54, when placing the players at a new table. Memory module 60 may store, for example, a "projected next seat" or similar identifier associated with the player in the queue. Memory module 60 may also store, for example, a "has played" or similar indicator to indicate which locations the player has already played (e.g., has played big blind, has played small blind, has played big blind and small blind, etc.). For example, if a player who just folded from the dealer or button position at a table is placed into a queue, gaming system 12 may place the player at a new table for a new hand at a location that is just to the left of the dealer or button at the new table. Similarly, a folding player who just posted the big blind ante before folding at a previous table may be placed at a new table at the small blind location for the next hand. A player may not always be placed at a new table at a location one spot over from the player's previous location at a previous table at which he just folded. Gaming system 12 may implement any suitable methods, procedures or seating processes for locating folding players at new tables. For example, in some cases gaming system 12 may utilize circumstances other than the player's previous location at a previous table when determining where to place the player at a new table.

In particular embodiments, to provide continuity from hand to hand, each player's screen display of their current table may have the seats rotated so that the player always appears at the same physical location on his table screen. This seat rotation function could be executed at gaming system 12 like other functionality discussed herein, or at the player's access element 14.

In particular circumstances, situations may arise where several players may be in the queue having the same projected next seat number. Any suitable method may be used to determine which player is granted the projected next seat number held by the multiple players. For instance, if several idled players came from seat four at different tables and they were queued to be seated in seat number three, then in some cases a FIFO based seating algorithm may be used. A timestamp associated with the player in the queue may be used to resolve contention issues. For example, if two players have the same projected-next-seat-number, with other factors being equal, if the seating takes place clockwise from the earliest seats, the player with the earliest timestamp may be assigned the open seat, and the other player may wind up at subsequently assigned seat. The timestamp may also be used to condition selections, such as to give a new player more of an opportunity to first play the big blind. For instance, setting a new player's timestamp to represent a date several months before the actual game date may cause his entry to be selected prior to already active player's entries.

Particular embodiments may utilize similar or other methods or factors in seating players. An example of one seating process that may be used that includes some of the functionality discussed above follows. For example, when a player folds or finishes an active hand, if the player has finished playing one of the blind seats, the hand process will set the "has-played" variable corresponding to the blind seat player in the player's record in the player-game file. If a player has just played the big blind, his has-played-big-blind variable will be set. The has-played-small-blind variable may be set when seat one is played. These variables may be used to reduce the possibility that a player will replay either blind. These variables may be maintained, for example in memory module 60, as components associated with the player-game file and the queue.

Continuing the example, gaming system 12 may decrement a projected-next-seat-number in the player's record. If the projected-next-seat-number goes to zero, it may be reset to the highest seat number, or the button seat, and any "has-played" variables may be reset. Having the projected-next-seat-number set to the button seat represents a restarting of the seating process for the player. When the queue includes a sufficient number of idled players to constitute a new table, an evaluation process may be used to seat the big blind before seating the small blind. Blind selections may be by lowest projected-next-seat-number with the earliest timestamp for players who do not have a blind variable set for the respective blind. As indicated above, having a has-played variable set for a particular location may mean that the player has played or has recently played that location. In a case where all queued players have their has-played-big-blind variable set, the system may have to seat the earliest player regardless.

Continuing the example, after both blinds are seated, a similar evaluation process may be used to seat the button seat signifying that the button holds some seating distinction when compared to the remaining seats. Similar to the has-played blind variables, a has-played-button variable may be used to distinguish if someone has had the opportunity to play the button. The player with the lowest seat number, earliest timestamp and without the has-played-button variable set may be assigned the button seat. The has-played-button variable may be reset when a player's next projected seat becomes the button seat. If all players have already played the button and have their has-played-button variable set, then the player with the highest next projected seat number and most current timestamp may be seated at the button seat.

The assignment of the remaining seats, from seat three clockwise to the seat before the button, may be like that of the blinds, using the lowest projected-next-seat-number with the earliest timestamp.

As indicated above, some games provided by gaming system 12 may not have the concept of pre-defined blinds or the button. For example, in seven card stud, all players ante the same amount, and on the first betting round the player with the lowest face card is treated like seat one. The player with the low face card must bet either a small ante or a big ante amount, and then player responses rotate clockwise from his seat. In this case, players may be seated similar to the rules used for non-blind seats, where players are seated clockwise using the lowest projected-next-seat-number with the earliest timestamp. Exceptions for the blinds and the button, such as the has-played variables, may not be utilized in some embodiments.

In some traditional games, if a player sits out for a couple of rounds of play, he is not penalized. If he attempts to sit out longer, his chips may be removed from the table, and a new player may be seated in his place. Then, when the first player returns and reenters the game, he has to again post the big blind. In particular embodiments, however, there is no concept of sitting out of a hand, because players who are taking a break do not appear at a permanent table. Therefore, a returning virtual table player with an existing account 62 in memory module 60 may be seated just as if he had remained active. He may not be required to post the big blind because information such as his projected next seat number may be stored to be used in seating him at a new table. In some cases no changes are made to the variables and indicators in his record in his account 62, and lobby process 52 may insert an entry for him in the a queue 66.

Particular embodiments thus provide seating processes and algorithms that are simple, flexible, and robust. Given fair and robust as a general seating criteria, more than one algorithm exists which would yield satisfactory seating results. For example, in particular embodiments for each player a count of how many times he played a particular seat may be kept with the timestamp of the last time he played the seat. Whenever the minimum value of these player seat-counts exceeded zero, they may be reduced by the minimum count so as to base the counts to zero. Then, selecting from high seat to low, the lowest seat count with the earliest timestamp may be used to seat players. This method comprises another fair and robust algorithm that may be used in particular embodiments.

In general, the ability to move folding players into an idle player queue for subsequent placement in a new table gives designers unique options to use software techniques to enhance the quality of the action. In some cases a player may be allowed to fold out of turn and immediately go into another hand. When he folds out of turn, his entry may be inserted in a queue 66. To avoid other players at the old and new tables detecting this, the system may disguise (e.g., at player access elements 14) the player's name or other identifier and money or points amounts at the new table while the player still appears to be active at his prior table, waiting his turn to fold. When there are many active tables, as might be the case in a large tournament, this precaution may not be as beneficial.

As an example, if the gaming system 12 is waiting for a response from a player at seat three, if a player in seat nine elected to fold out of turn, the queue process may immediately put an entry for that player in a queue 66. From there the player may be assigned a seat at the next available table. Since his original seat may still appear to be active, to keep players who are viewing multiple different screens from knowing that a particular player has folded early, the early folding player game name and amount of money or points he is playing may be temporarily changed at the new table.

In addition, when a player is moved to another table (for example, after folding or otherwise completing a hand at a previous table), the player's name or other identity presented for view by other players may change. For example, a player may be playing as "charlie" at one table and may fold. Gaming system 12 may send the player to another table (for example through a queue process in some cases). At the new table, gaming system 12 may display another name for the player, such as "bill." Changing players display names when they change tables makes it less likely that other players can determine the changed name player's true identity. This can reduce the chance that other players can learn the changed name player's playing style.

As described herein, particular embodiments provide the positive consequences of seamlessly increasing the action. In particular embodiments when the number of players for a particular game is very small (e.g., between two and four), locating folding players at a new table may be of less benefit. At a level of five players, however, three people could be seated at a new table. As the number of players increases, the number of seats can be ramped up to an optimum number. For example, no-limit Hold 'Em is generally played with nine players. When there are seven players, four could be seated at a table in order to provide the ability to move players to a queue for placement at a different table upon folding. With nine players, five could be seated. At eleven players, six could be seated. This could continue until seventeen players are participating, and then the seating could be set to the maximum of nine. Conversely, when the number of players falls into the low ranges, the maximum seating may be ramped down in order to keep providing the functionality described herein.

The methods discussed herein are ideal for large multi-table tournaments because they may greatly speed up the action. Since some players attempt to play slower in tournaments in order to survive longer, in order to balance out the number of hands played by each player, the gaming system 12 may force faster players to wait for the completion of hands. For example, faster players may have to wait for completion of a hand at their current table upon folding instead of being sent to a queue for placement at a new table. In addition, the faster players may be pulled from an idle player queue more slowly than other players in an effort to slow down the faster players. Slowing down faster players may be used in conjunction with a penalty for slower players. The total amount of money anted as blinds by each player may also be used to help determine which players may need to be slowed down or sped up.

With respect to some games, seating methods discussed herein may reduce the need for certain graphic displays and may simplify a lobby screen. For example, since players at tables may change constantly, there may be no permanent tables to be displayed in some embodiments, and a player does not have to wait and/or contend for a seat at a table. For example, in some embodiments when a player selects a game type, instead of being displayed a list of tables, he may automatically be seated when his entry becomes active in the queue.

In particular embodiments, players have less of an opportunity to become familiar with the style or characteristics of play of the other players as may be the case with other, traditional games in which players play multiple hands at the same table. Players may not be able to "read" or get "tells" as to whether a player is a good or poor player. They will not have a mental history in order to know if the player is an aggressive bettor or a conservative caller. This will take away a huge advantage of many great players. To reduce the effect of this disadvantage, some embodiments may display information to help define a player's skill level.

As an additional advantage, particular functionality discussed herein allows dealer's choice games to occur more efficiently. Frequently dealer's choice games are played in home poker games. One player may choose to deal Hold 'Em, another player may choose to deal Omaha High and still another player may deal Seven Card Stud. Since the maximum seating for Seven Card Stud is eight players, if the number of players is greater than eight, then Seven Card Stud cannot be dealt without having one player sit out of the hand. The same may be true for traditional online poker games. However, in embodiments discussed herein, the maximum size of the table may not be a restraint allowing a "dealer" player to choose any suitable game. Since gaming system 12 may control the seating of players (for example, from a queue 66), players may be seated at various sized seating arrangements to satisfy a particular requirement for a game chosen by a dealer player.

In a related situation, some online poker games seat the same type of game differently. For instance, one site may seat no-limit Hold 'Em with nine players, and another may seat it with ten players. Using the functionality described herein, gaming system 12 may offer a dealer's choice where the dealer has the option to establish the seating differently for a particular type of game, such as no-limit Hold 'Em. For example, a player identified as the dealer may select a game to play as well as a number of players for the game. The queue can then fill the table with waiting players according to the number of players preferred by the "dealer."

As indicated above, gaming system 12 may keep game and player records and history. Play review process 58 allows player to go back and see how one or more particular hands were played. These hands may include hands that the player was involved in or hands of other players. History 70 may store the relevant game play information to make this possible. A player who just folded or otherwise completed a hand may be allowed to go back and review that hand. In particular embodiments, the gaming system may allow the player to see the cards of all other players in the hand to see their playing style. While allowing a player to view other player's actual play may not be advantageous in traditional card games, the functionality of particular embodiments to move players across tables to play with a multitude of players in a given session may make it less likely that the reviewing player obtains any advantage of the player whose play was reviewed. In some cases gaming system 12, for example through queue process 56 and/or seating process 54, may ensure that those two players are not placed at the same table in the future. In addition, changing a player's screen name or identity across sessions or tables also may reduce or eliminate any advantage to be gained by a reviewing player on a player whose hands are reviewed. Moreover, gaming system may associate an alias with a player whose play is being reviewed.

In some cases gaming system 12 may associate a skill level with players whose play is being reviewed. For example, a novice player may desire to view play of a highly skilled or "expert" player. Gaming system 12 may present historical hands played by highly skilled or expert players for view by the novice player.

In some embodiments players may be able to view historical hands played at any point in time. This would be inefficient in games where everyone sits and plays at the same table because the other players at the table may want to wait while one player is reviewing historical hands. Moving players across tables however enables a player to stop playing and view historical hands or perform other tasks. For example, after folding or otherwise completing a hand a player may elect to review hands or other information provided by gaming system 12 instead of being immediately joining another table or being placed into a queue to join another table. In some embodiments an active player may be able to review historical hands or other gaming system information while playing, or he may also do this while in a paused state. When a player decides to sit out of a hand and go to the paused state, in some embodiments he will not be shown as "sitting out" at a table because he will not appear at any tables, and a seat will not be assigned to him until he returns to the game.

In particular embodiments gaming system 12 may provide players with the ability to report other players as possibly cheating. Allowing a player to go back and review a hand that was played while viewing each players' cards may facilitate the identification of cheating play on the part of one or more players who were playing the hand. Once gaming system 12 receives a report of a possible cheating player or incident, it may automatically or through associated personnel review the play to take appropriate action.

Figure 4:
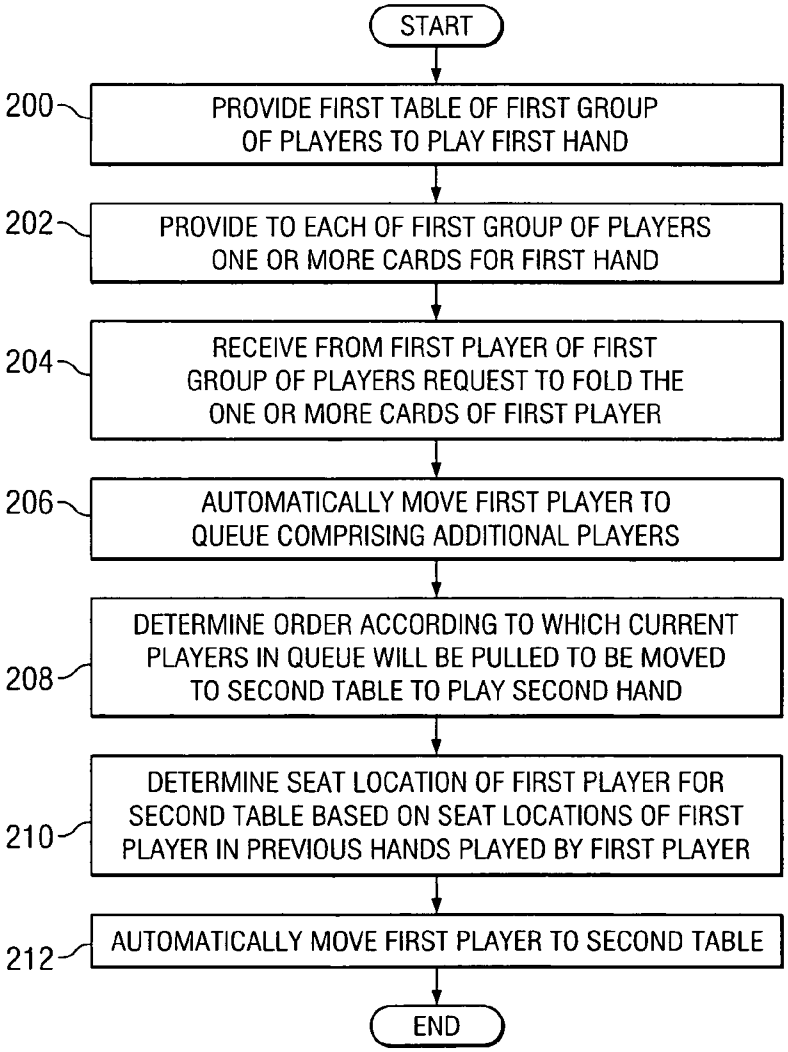
FIG. 4 is a flowchart illustrating a method for computer gaming, in accordance with a particular embodiment.

FIG. 4 is a flowchart illustrating a method for computer gaming, in accordance with a particular embodiment. The method begins at step 200 where a first table of a first group of players is provided to play a first hand of a game, such as a poker game. In particular embodiments, each of the first group of players may be accessing a gaming system over one or more communication networks. At step 202, one or more cards are provided to each of a first group of players for the first hand. The cards may be dealt by a gaming system randomly in some embodiments.

At step 204 a request is received from a first player of the first group of players to fold the one or more cards of the first player. This request may be received, for example, by the first player transmitting a fold request using an access element associated with the first player. In some cases the first player may transmit instructions regarding how to play various hands to a gaming system (e.g., before game play in some situations). Thus, the request to fold in various situations may be encompassed in these instructions, and the gaming system may follow these instructions to fold the first player's one or more cards in applicable circumstances. In particular cases the first player may be folding at step 204 well into a hand after one or more rounds of betting, such as after the flop or river card in Hold 'Em.

At step 206, the first player is automatically moved to a queue comprising additional players. For example, in response to the folding the first player may be moved to a queue so that the first player may be joined with other players at a new table to play a new hand without having to wait on the conclusion of the first hand at the first table. This may be performed without a specific user request at that time to move to a new table. In some cases a gaming system may prompt the first player when he folds whether he wants to move to a new table to play a new hand without waiting on the conclusion of the first hand at the first table.

At step 208, an order is determined according to which current players in the queue will be pulled to move to a second table to play a second hand. The determined order may comprise any suitable order, such as a FIFO order. In some cases, players may be pulled according to a priority associated with gaming system 12 (e.g., higher wagering players may be pulled first). In some cases players may be pulled according to seat location. For example, if it is desired that a given player sit at a particular location at a new table, then that player may be pulled to sit at such location at the new table before another player who is associated with a next seat location that has already been assigned at the new table.

At step 210, the seat location of the first player for the second table is determined based on seat locations of the first player in previous hands played. For example, if the first player just played at the big blind spot in Hold 'Em at the first table, then his seat location at the second table may be determined to exclude the big blind spot. At step 212, the first player is automatically moved from the queue to the second table to play the second hand. One or more other players at the second table may be different from those players who were at the first table with the first player. The movement to the second table may occur without specific user request at that time. In some cases, the first player may not even know that he spent time in the queue. In addition, his movement from the first table to the second player may appear seamless.

Some of the steps illustrated in the flowchart of FIG. 4 may be combined, modified or deleted where appropriate, and additional steps may also be added to the flowchart. Additionally, steps may be performed in any suitable order without departing from the scope of the invention.

Although the present invention has been described in detail with reference to particular embodiments, it should be understood that various other changes, substitutions, and alterations may be made hereto without departing from the spirit and scope of the present invention. For example, although the present invention has been described with reference to a number of elements included within a gaming system, these elements may be combined, rearranged or positioned in order to accommodate particular operational configurations or needs. In addition, any of these elements may be provided as separate external components to the gaming system where appropriate. The present invention contemplates great flexibility in the arrangement of these elements as well as their internal components.

Numerous other changes, substitutions, variations, alterations and modifications may be ascertained by those skilled in the art and it is intended that the present invention encompass all such changes, substitutions, variations, alterations and modifications as falling within the spirit and scope of the appended claims. Moreover, the present invention is not intended to be limited in any way by any statement in the specification that is not otherwise reflected in the claims.

What is claimed is:

1. A computer gaming system, comprising:

a server configured to communicate with a plurality of client devices, the server further configured to:

manage a first virtual table of a first plurality of players playing a first hand of a poker card game via a communication interface;

provide to each of the first plurality of players one or more cards for the first hand;

receive communication from a first player of the first plurality of players representing a request to fold the cards of the first player, wherein the request to fold the cards of the first player is made when gameplay is at a position of another one of the first plurality of players; and in response to the request to fold, move the first player automatically to a second virtual table of a second plurality of players to play a second hand while the first hand is still active for at least one of the other players at the first table, wherein once the first player is moved, the server prevents the first player from playing the first hand.

2. The computer gaming system of claim 1, wherein the server is configured to maintain an appearance that the first player is active at the first virtual table after the first player has been moved to the second virtual table until gameplay at the first virtual table reaches a position of the first player.

3. The computer gaming system of claim 1, wherein the server is configured to temporarily alter a name of the first player at the second virtual table while maintaining the appearance that the first player is active at the first virtual table.

4. The computer gaming system of claim 1, wherein the server is configured to automatically move all players remaining at the first virtual table to other virtual tables upon completion of the first hand.

5. The computer gaming system of claim 1, wherein the server is configured to determine a seating location of the first player at the second virtual table based upon a seating location of the first player at the first virtual table.

6. The computer gaming system of claim 1, wherein the server is configured to place the first player at a same displayed location at the first virtual table and the second virtual table.

7. The computer gaming system of claim 1, wherein the server is configured to allow the first player to view the cards of one or more players from the first hand after the first player has been moved to the second virtual table.

8. The computer gaming system of claim 7, wherein the server is configured to prevent the first player to be placed at the same table as the one or more players from the first hand for which the first player viewed cards from the first hand.

9. The computer gaming system of claim 7, wherein the server is configured to allow the first player to report one or more players for cheating after the first player viewed the cards of one or more players from the first hand.

10. The computer gaming system of claim 1, wherein the server is configured to create a new virtual table when a number of players associated with a game type reaches a predetermined threshold.

11. The computer gaming system of claim 1, wherein the second virtual table is populated with less than a maximum number of players associated with the second virtual table.

12. The computer gaming system of claim 1, wherein the first player is moved to the second virtual table based upon at least a type of poker card game chosen by a dealer player of the second virtual table.

13. A computer-implemented method for playing an electronic card game, comprising:

providing, by a processor, a first virtual table of a first plurality of players playing a first hand of a poker card game via a communication interface;

providing, by the processor, to each of the first plurality of players one or more cards for the first hand;

receiving, via the communication interface, from a first player of the first plurality of players a request to fold the cards of the first player, wherein the request to fold the cards of the first player is made when gameplay is at a position of another one of the first plurality of players; and in response to the request to fold, automatically moving, by the processor, the first player to a second virtual table of a second plurality of players to play a second hand while the first hand is still active for at least one of the other players at the first table, wherein once the first player is moved, the processor prevents the first player from playing the first hand.

14. The computer-implemented method of claim 13, further comprising:

maintaining the appearance that the first player is active at the first virtual table after the first player has been moved to the second virtual table until gameplay at the first virtual table reaches a position of the first player.

15. The computer-implemented method of claim 13, further comprising:

temporarily altering the name of the first player at the second virtual table while maintaining the appearance that the first player is active at the first virtual table.

16. The computer-implemented method of claim 13, further comprising:

automatically moving all players remaining at the first virtual table to other virtual tables upon completion of the first hand.

17. The computer-implemented method of claim 13, further comprising:

determining a seating location of the first player at the second virtual table based upon a seating location of the first player at the first virtual table.

18. The computer-implemented method of claim 13, further comprising:

placing the first player at a same displayed location at the first virtual table and the second virtual table.

19. The computer-implemented method of claim 13, further comprising:

allowing the first player to view the cards of one or more players from the first hand after the first player has been moved to the second virtual table.

20. The computer-implemented method of claim 19, further comprising:

preventing the first player to be placed at the same table as the one or more players from the first hand for which the first player viewed cards from the first hand.

21. The computer-implemented method of claim 19, further comprising:

allowing the first player to report one or more players for cheating after the first player viewed the cards of one or more players from the first hand.

22. The computer-implemented method of claim 13, further comprising:

creating a new virtual table when a number of players associated with a game type reaches a predetermined threshold.

23. The computer-implemented method of claim 13, further comprising:

populating the second virtual table with less than a maximum number of players associated with the second virtual table.

24. The computer-implemented method of claim 13, further comprising:

moving the first player to the second virtual table based upon at least a type of poker card game chosen by a dealer player of the second virtual table.

25. A non-transitory computer-readable storage medium including instructions that, when executed by a processor, perform a method for playing an electronic card game, comprising:

providing a first virtual table of a first plurality of players playing a first hand of a poker card game via a communication interface;

providing to each of the first group plurality of players one or more cards for the first hand;

receiving from a first player of the first plurality of players a request to fold the cards of the first player, wherein the request to fold the cards of the first player is made when gameplay is at a position of another one of the first plurality of players; and in response to the request to fold, automatically moving the first player to a second virtual table of a second plurality of players to play a second hand while the first hand is still active for at least one of the other players at the first table, wherein once the first player is moved, the first player is prevented from playing the first hand.

26. The non-transitory computer-readable storage medium of claim 25, further comprising:

maintaining the appearance that the first player is active at the first virtual table after the first player has been moved to the second virtual table until gameplay at the first virtual table reaches a position of the first player.

27. The non-transitory computer-readable storage medium of claim 25, further comprising:

temporarily altering the name of the first player at the second virtual table while maintaining the appearance that the first player is active at the first virtual table.

28. The non-transitory computer-readable storage medium of claim 25, further comprising:

automatically moving all players remaining at the first virtual table to other virtual tables upon completion of the first hand.

29. The non-transitory computer-readable storage medium of claim 25, further comprising:

determining a seating location of the first player at the second virtual table based upon a seating location of the first player at the first virtual table.

30. The non-transitory computer-readable storage medium of claim 25, further comprising:

placing the first player at a same displayed location at the first virtual table and the second virtual table.

31. The non-transitory computer-readable storage medium of claim 25, further comprising:

allowing the first player to view the cards of one or more players from the first hand after the first player has been moved to the second virtual table.

32. The non-transitory computer-readable storage medium of claim 31, further comprising:

preventing the first player to be placed at the same table as the one or more players from the first hand for which the first player viewed cards from the first hand.

33. The non-transitory computer-readable storage medium of claim 31, further comprising:

allowing the first player to report one or more players for cheating after the first player viewed the cards of one or more players from the first hand.

34. The non-transitory computer-readable storage medium of claim 25, further comprising:

creating a new virtual table when a number of players associated with a game type reaches a predetermined threshold.

35. The non-transitory computer-readable storage medium of claim 25, further comprising:

populating the second virtual table with less than a maximum number of players associated with the second virtual table.

36. The non-transitory computer-readable storage medium of claim 25, further comprising:

moving the first player to the second virtual table based upon at least a type of poker card game chosen by a dealer player of the second virtual table.

37. A computer-implemented method for playing an electronic card game, comprising:

displaying, at a first player's computer system, a first virtual table representing a hand of a poker card game, the displaying including simulation of cards dealt to the player and to other players at the first virtual table; and in response to a first player's request to fold when gameplay is at a position of another player at the first virtual table, communicating the request to a gaming system, wherein based on a response from the gaming system, the first player is automatically moved to a second virtual table while the first hand is still active for at least one of the other players at the first table, wherein once the first player is moved, the first player is prevented from playing the hand.

38. The computer-implemented method of claim 37, wherein the first player's computer system displays a second hand at the second virtual table seamlessly after the first player's request to fold.

39. The computer-implemented method of claim 37, further comprising:

displaying an altered name of the first player at the second virtual table.

40. The computer-implemented method of claim 37, further comprising:

displaying a seating location of the first player at the second virtual table based upon a seating location of the first player at the first virtual table.

41. The computer-implemented method of claim 37, further comprising:

displaying the first player at a same displayed location at the first virtual table and the second virtual table.

42. The computer-implemented method of claim 37, further comprising:

allowing the first player to view the cards of one or more players from the hand at the first virtual table after the first player has been moved to the second virtual table.

43. A non-transitory computer-readable storage medium including instructions that, when executed by a processor, perform a method for playing an electronic card game, comprising:

displaying, at a first player's computer system, a first virtual table representing a hand of a poker card game, the displaying including simulation of cards dealt to the player and to other players at the first virtual table; and in response to a first player's request to fold made when gameplay is at a position of another player at the first virtual table, communicating the request to a gaming system, wherein based on a response from the gaming system, the first player is automatically moved to a second virtual table while the hand is still active for at least one of the other players at the first virtual table, wherein once the first player is moved, the first player is prevented from playing the hand.

44. The non-transitory computer-readable storage medium of claim 43, wherein the first player's computer system displays a second hand at the second virtual table seamlessly after the first player's request to fold.

45. The non-transitory computer-readable storage medium of claim 43, further comprising:

displaying an altered name of the first player at the second virtual table.

46. The non-transitory computer-readable storage medium of claim 43, further comprising:

displaying a seating location of the first player at the second virtual table based upon a seating location of the first player at the first virtual table.

47. The non-transitory computer-readable storage medium of claim 43, further comprising:

displaying the first player at a same displayed location at the first virtual table and the second virtual table.

48. The non-transitory computer-readable storage medium of claim 43, further comprising:

allowing the first player to view the cards of one or more players from the first hand at the first virtual table after the first player has been moved to the second virtual table.

49. A computer gaming system, comprising:

an access element, including a processor, configured to communicate with one or more servers of the gaming system, the access element further configured to:

display a first virtual table representing a hand of poker game, the displaying including simulation of cards dealt to the player and to other players at the first virtual table; and in response to a first player's request to fold made when gameplay is at a position of another player at the first virtual table, communicate the request to the one or more servers of the gaming system, wherein based on a response from the one or more servers the first player is automatically moved to a second virtual table while the hand is still active for at least one of the other players at the first virtual table, wherein once the first player is moved, the first player is prevented from playing the hand.

50. The computer gaming system of claim 49, wherein the access element is further configured to display a second hand at the second virtual table seamlessly after the first player's request to fold.

51. The computer gaming system of claim 49, wherein the access element is further configured to display an altered name of the first player at the second virtual table.

52. The computer gaming system of claim 49, wherein the access element is further configured to display a seating location of the first player at the second virtual table based upon a seating location of the first player at the first virtual table.

53. The computer gaming system of claim 49, wherein the access element is further configured to display the first player at a same displayed location at the first virtual table and the second virtual table.

54. The computer gaming system of claim 49, wherein the access element is further configured to allow the first player to view the cards of one or more players from the hand at the first virtual table after the first player has been moved to the second virtual table.

* * * * *